United States Patent [19]

McCrea

[11] 4,069,728

[45] Jan. 24, 1978

[54] SHEET SLITTING APPARATUS

[75] Inventor: James E. McCrea, Fairport, N.Y.

[73] Assignee: Xerox Corporation, Stamford, Conn.

[21] Appl. No.: 773,577

[22] Filed: Mar. 2, 1977

[51] Int. Cl.² .................. B26D 19/00; B65H 5/08
[52] U.S. Cl. ................................. 83/409; 83/435;
83/435.1; 271/277
[58] Field of Search ............... 83/151, 409, 409.1,
83/410, 411 R, 412, 415, 435, 435.1; 271/277

[56] References Cited

U.S. PATENT DOCUMENTS

| 2,996,982 | 8/1961 | Alm | 83/151 X |
| 3,200,687 | 8/1965 | Paulson | 83/410 X |

Primary Examiner—J. M. Meister

[57] ABSTRACT

Sheet slitting apparatus which includes a plurality of belt members each having a clamp to receive the leading edge of a sheet to be slit. The clamps are urged downwardly by the action of guide members arranged in the belt path to grip the sheet securely during the slitting operation. The clamps are released after slitting is completed.

5 Claims, 4 Drawing Figures

SHEET SLITTING APPARATUS

This invention relates to sheet slitting and in particular to apparatus for registering clamping and transporting paper sheets which are to be slit with high accuracy and control throughout the slitting operation.

It is often found desirable to slit larger sheets of paper for example, 17 × 11 sheets into two 8 ½ × 11 sheets. It has been found that the difficulty in handling a single sheet of paper through a slitter renders the slitting operation as cumbersome and expensive due to the fact that the sheet does not handle easily and wrinkles or tears during handling and/or during the slitting operation. For example, U.S. Pat. No. 3,177,746 describes a gripping device which relies upon friction forces in gripping and pulsing a film sheet. The existing devices have not been altogether satisfactory in handling paper sheets due to damage to the paper while movement is imparted thereto and a lack in the control thereof.

It is therefore an object of the present invention to improve the handling of large sheets to be slit into smaller size sheets.

It is a further object of the present invention to improve the registering, clamping and transporting of paper sheets through a slitting device to achieve improved accuracy and control during the slitting operation.

It is still a further object of the present invention to insure that a relatively large sheet of paper which is to be slit into smaller sheets is delivered to the slitting station with a minimum of friction without wrinkling or otherwise damaging the sheet.

It is still a further object of the invention to increase the speed at which larger sheets can be slit into smaller sheets while maintaining positive control and registration.

The above objects and still others are achieved in accordance with the instant invention which is shown in the accompanying drawings in which.

Figure 1:
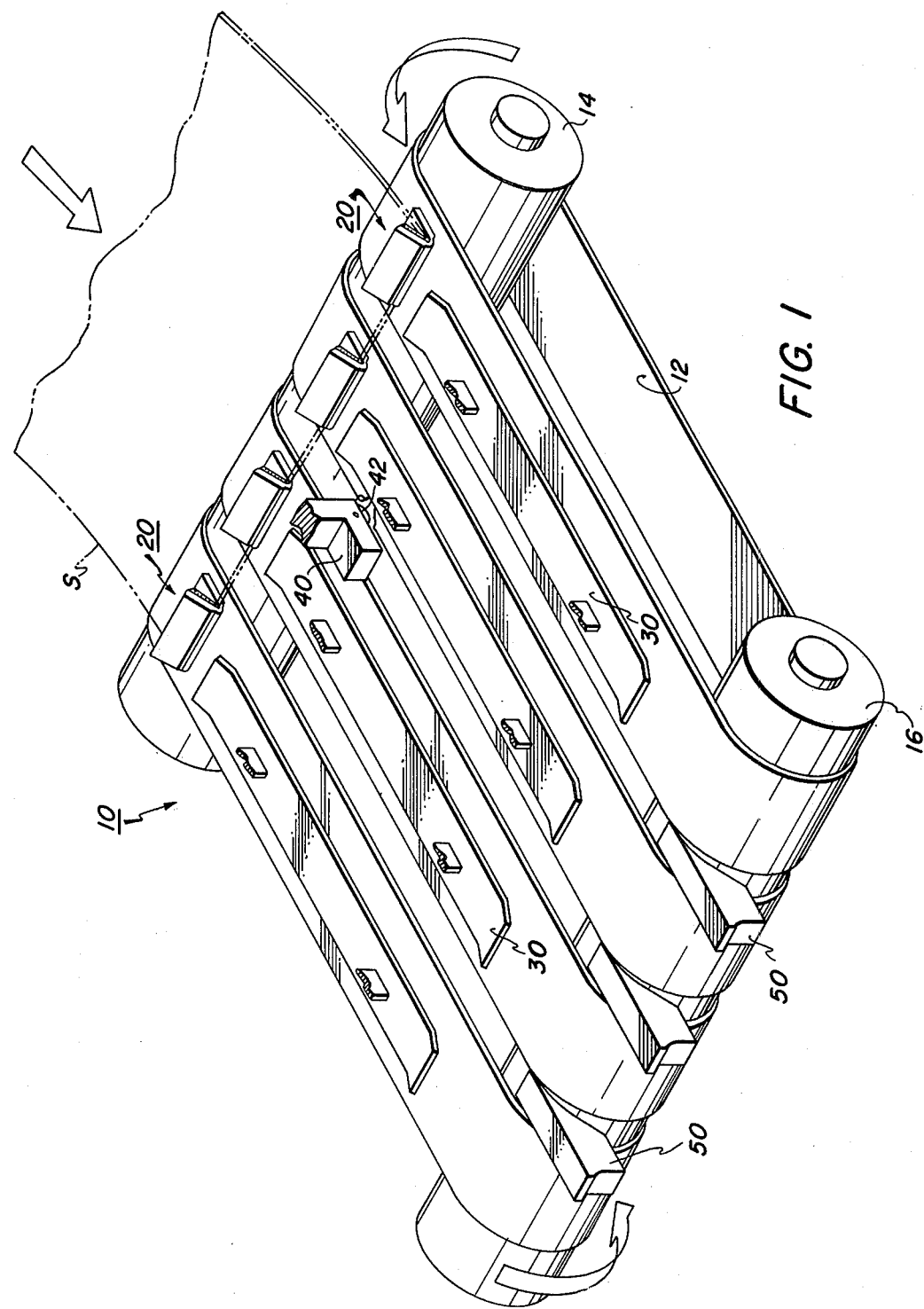
FIG. 1 is an isometric view of the improved paper slitting apparatus of the instant invention.
Figure 2:
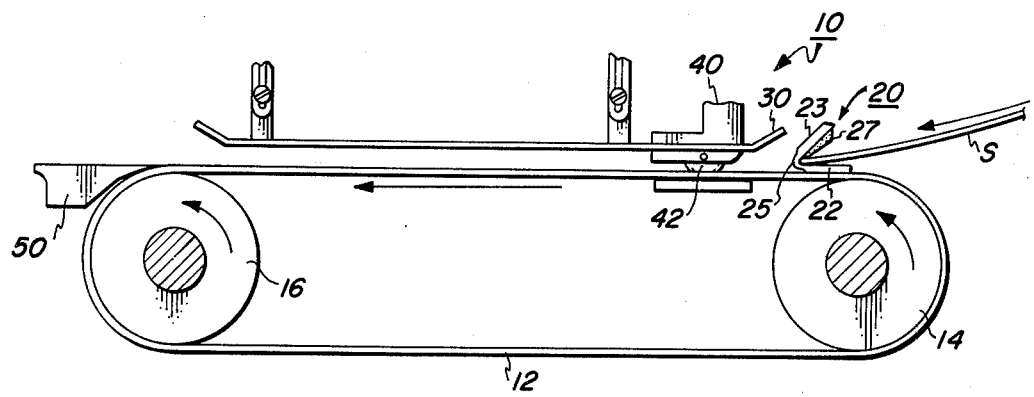
FIG. 2 is a side view of the paper slitting apparatus of this invention.
Figure 3:
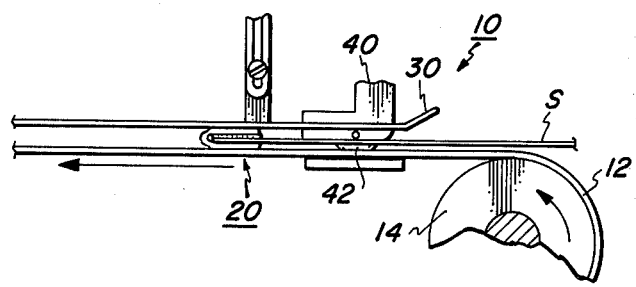
FIG. 3 is a side view similar to FIG. 2 showing details of the clamping action at a subsequent time in the operation of the apparatus.

Turning now to FIGS. 1 – 3 the paper slitting apparatus generally designated 10 delivers a large size sheet S which desirably is 11 × 17 in size and which is to be cut into two smaller equal size sheets which are 8 ½ × 11 in size. The paper slitting apparatus 10 includes a plurality of belt members 12 supported on roller members 14 and 16 which are suitably driven at the appropriate speed when a sheet S is fed thereto. The sheet S desirably is traveling at a higher rate of speed than the belt members so as to insure proper registration and a slight buckle of the sheet as it enters into registration with the belt 12. Each of belt members 12 is arranged with a clamping member 20 which may be secured to the belt members in any suitable manner as by an adhesive. Clamping member 20 includes leg portion 22 and leg portion 23 which are joined along a hinge axis 25. Clamping members 20 are made out of a flexible material such as plastic or the like which is sufficiently flexible so as to effect the desired clamping action at the lead edge of the sheet as will become more apparent. It will be noted that each of the clamping members 20 has an elastic member 27 which is made out of cellular foam material, rubber or the like to effect the desired gripping action on the lead edge of the sheet S without causing damage thereto.

Clamping members 20 as they are advanced by the belt members 12 close securely on the lead edge of the sheet S due to the action imparted by guide members 30 which serve to close the clamping members along the leading edge of the sheet S. Guide members 30 are vertically adjustable to vary the pressure of clamping members 20 on sheet S.

Slitting apparatus 40 is positioned at the center line of Sheet S and desirably includes a slitting wheel 42 to effect the desired slitting operation. Sheet S which is slit down the center thereof remains securely clamped until the clamping members 20 are release from the guide members 30. At this time pick off fingers 50 serve to direct the slit sheets from the belt members in the direction of transport rolls (not shown) or the like which advance the sheets along their intended path. It will now be appreciated that the sheet S is slit into two equal sheets due to the fact that proper registration is maintained during the entire slitting operation to produce the desired high accuracy and control.

Figure 4:
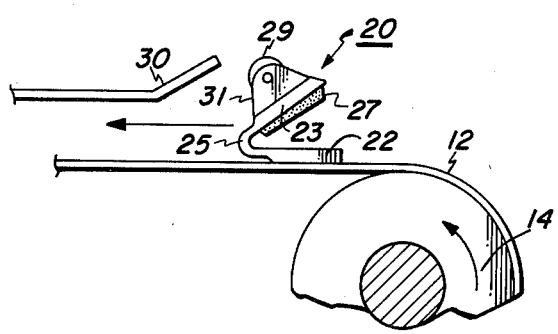
FIG. 4 is an alternate embodiment for the clamping assembly for use with the instant invention.

FIG. 4 illustrates an alternative clamping member 20 which is provided with a roller 27 positioned in support 31 of leg portion 23 at the top. Roller 25 rides in contact with the associated guide member 30 to facilitate the clamping action of the clamping member on the sheet S.

It will now be appreciated that by the above described invention that sheets to be slit are pulled through the slitter in a controlled manner with minimum friction or tearing forces on the sheets. At the same time front edge registration is maintained to ensure positive control and accuracy of slit at relatively high speed operation.

While there have been shown and described and pointed out the fundamental novel features of the invention as applied to a preferred embodiment, it will be understood that various ommissions and substitutions and changes in the form and details of the device illustrated and in its operation may be made by those skilled in the art without departing from the spirit of the invention.

What is claimed is:

1. Sheet slitting apparatus comprising:
    a pluarlity of belt members for receiving sheets to be slit, each of said belt members including at least one clamping means receiving the leading edge of the sheet,
    drive means for moving said belt means to pull the sheet along a predetermined path past a slitting station,
    guide means arranged along the sheet path to force said clamping means to close securely at the leading edge of the sheet received therein prior to the sheet arriving at said slitting station,
    slitting apparatus positioned in the sheet path at the slitting station to effect slitting of the moving sheet while being pulled by said belt members and clamping means,
    said guide means extending for a predetermined extent past the slitting station whereby said clamping means are released upon continued advance of said belt members to release the sheet therefrom after completion of the slitting operation.

2. Apparatus according to claim 1 wherein the portion of said guide means is adjustable vertically relative to the sheet path.

3. Apparatus according to claim 2 wherein said clamping means includes flexible two-legged member secured to its associated belt member including a first leg portion of said member is disposed in a plane parallel to the path of said belt member and a second leg portion extends at an acute angle relative thereto.

4. Apparatus according to claim 3 wherein said second leg portion has a pad member secured thereto.

5. Apparatus according to claim 3 wherein said clamping means includes a roller member disposed at the top of said leg portion for riding in contact with said guide means.

* * * * *